Richard H. Purnelle.

Cotton-Cultivator.

No. 119,644. Patented Oct. 3, 1871.

Witnesses: Inventor:
Richard H. Purnelle.
Per
Attorneys.

UNITED STATES PATENT OFFICE.

RICHARD H. PURNELLE, OF BEULAH, MISSISSIPPI.

IMPROVEMENT IN COTTON-CULTIVATORS.

Specification forming part of Letters Patent No. 119,644, dated October 3, 1871; antedated September 23, 1871.

*To all whom it may concern:*

Be it known that I, RICHARD H. PURNELLE, of Beulah, in the county of Bolivar and State of Mississippi, have invented a new and Improved Cotton-Cultivator; and I do hereby declare the following to be a full, clear, and exact description of the same, reference being had to the accompanying drawing making a part of this specification, in which—

Figure 1:
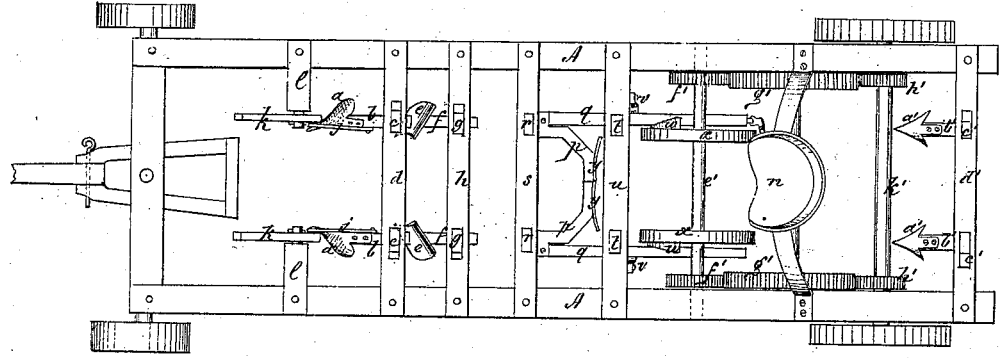
Figure 2:
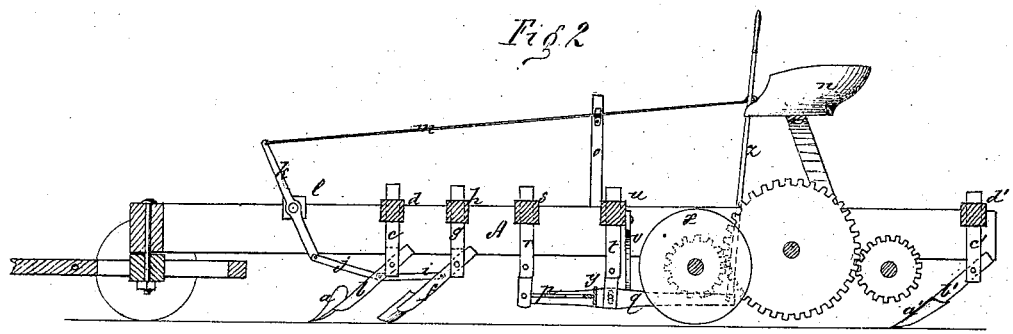
Figure 3:
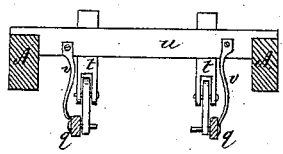

Figure 1 is a top view; Fig. 2 is a longitudinal section, and Fig. 3 is a transverse section.

This invention consists in the combination in one machine of a barring-off mechanism, a scraping mechanism, a cutting-out mechanism for bringing the plants to stands, and a throwing-on mechanism for heaping soil upon the stands.

Referring to the drawing, $a$ $a$ are the barring-off shovels, the bars $b$ of which are pivoted to standards $c$ that are secured in a cross-bar, $d$, of the frame A, said barring-off shovels, as well as the scraping and throwing-on shovels, being so placed in the frame as to run one at each side of the row. The scrapers are seen at $e$, immediately in rear of the shovels $a$, the bars $f$ of said scrapers being pivoted to standards $g$ that are secured to a cross-bar, $h$. The bars $b$ and $f$ that are on the same side are connected by rods $i$, which are joined by links $j$ to the lower ends of levers $k$, which are pivoted to the inner extremities of blocks $l$ that are attached to the frame A at each side thereof. Rods $m$ run back from the upper ends of the levers $k$ to the driver's seat $n$, said rods being supported by standards $o$. By means of the rods $m$ and their co-operation devices the shovels $a$ and $e$ may be raised or lowered, as desired, by the driver while in his seat. The cutters are seen at $p$, the same being attached horizontally to bars $q$ which are jointed at their front ends to standards $r$ that extend downward from a cross-bar, $s$, in rear of the scrapers $e$. The bars $q$ are pivoted near their centers to standards $t$ that extend downward from a cross-bar, $u$, in rear of the cross-bar $s$. Springs $v$, secured to the cross-bar $u$, bear against the outer sides of the bars $q$ and press the same inward, so as to keep the inner ends of the knives $p$ in contact, except when separated by reason of cams $w$ attached to the outer sides of wheel $x$ coming in contact with the inner sides of the bars $q$ and forcing them outward, and consequently separating the cutters $p$, which are brought together again by the action of the springs $v$ as soon as the cams $w$ clear the bars $q$. The cutters $p$ while in contact with each other shave the top of the row, lopping off all the plants therein. When the cutters are temporarily separated by the operation of the cams $w$ and its co-active devices they leave a stand of plants in the row. Flanges $y$, attached to the rear sides of the cutters $p$, throw the dirt raised by the latter to each side of the plants. Bars $z$, jointed at their lower ends to the rear extremities of the bars $q$, and extending thence upward by the sides of the driver's seat, enable the latter to raise or lower the cutters $p$ so as to make them follow the inequalities of the surface. The throwing-on shovels are seen at $a'$, their bars $b'$ being pivoted to standards $c'$ that are attached to a cross-bar, $d'$, placed at the rear end of the machine. These shovels heap dirt upon the hills, differing in this respect from all the other shovels, which throw dirt away from the hills. The wheels $x$ are mounted on a shaft, $e'$, which is driven by means of gearing $f'$ $g'$ $h'$, that is operated by the rear axle $k'$.

Having thus described my invention, what I claim as new, and desire to secure by Letters Patent, is—

1. The arrangement in one machine for cultivating cotton of a barring-off, $a$, a scraping, $e$, a cutting-out, $p$, and a throwing-on mechanism, $a'$, as specified.

2. The combination of the frame A, cutters $p$, bars $q$, spring $v$, cams $w$, and wheels $x$, as described.

R. H. PURNELLE.

Witnesses:
SOLON C. KEMON,
A. W. HART.